INVENTOR.
WALTER F. DAUBITZ
BY Kenwood Ross
ATTORNEY.

Jan. 17, 1967 W. F. DAUBITZ 3,298,141
COLLET INDEXING AND GRINDING FIXTURE
Filed Sept. 4, 1963 4 Sheets-Sheet 3

INVENTOR.
WALTER F. DAUBITZ
BY Kenwood Ross
ATTORNEY.

Jan. 17, 1967  W. F. DAUBITZ  3,298,141
COLLET INDEXING AND GRINDING FIXTURE
Filed Sept. 4, 1963  4 Sheets-Sheet 4

INVENTOR.
WALTER F. DAUBITZ
BY Kenwood Ross
ATTORNEY.

United States Patent Office 3,298,141
Patented Jan. 17, 1967

3,298,141
COLLET INDEXING AND GRINDING FIXTURE
Walter F. Daubitz, Agawam, Mass., assignor to Oxford Precision, Inc., West Springfield, Mass.
Filed Sept. 4, 1963, Ser. No. 306,537
3 Claims. (Cl. 51—217)

The invention relates to a fixture for use with a grinding or other form of machine and constitutes a combined work supporting dividing head and work rotating organization for supporting a workpiece or tool to be ground or otherwise machined in operative relation to a grinding or other tool.

One important object of the invention is to provide a work or tool supporting chuck mounted for indexed axial rotation and axial tilting in a vertical plane and arranged for quick and accurate setting of a workpiece or tool with respect to grinding and cutting members of a machine tool.

A further object is to provide a workpiece or tool holding fixture having novel means, in conformance with the underlying principle of extreme simplicity, by which the angular relationship of the rotational axis of the workpiece or tool holding chuck and the axis of the grindstone or machine component of the machine to which the fixture may be attached may be varied without the use of complex screw mechanisms or equivalent.

The invention teaches a work carrying spindle fixture mounted for universal adjustment relative to a grinding or similar tool, which spindle and the workpiece or tool carried thereby can be accurately secured in any desired position to which it is adjusted, and which fixture can be readily set so as to be utilized as a dividing head as in those cases where flutes or like characteristics are to be ground on a piece of work.

As a further refinement hereof, I provide an improved form of device of the type above outlined having marked superiorities which radically distinguish it from presently known constructions which will feature easily and conveniently manipulative means for securing the workpiece accurately in position for operation thereupon; to provide for an increased range of adjustability over known types of similar devices as, for instance, to provide for three hundred sixty degrees and more of rotative adjustment of the work carrying spindle, and at the same time, to provide for a compact and easily accessible organization of component instrumentalities.

A further object is to provide means for achieving a selective manual rotation of the work with means for attaining the rotatively adjusted positions utilizing means that minimize, if not eliminate, vibration either in the work or the components supporting same.

As still another salient feature hereof, I provide a novel indexing code means whereby the workpiece holding chuck may be quickly and easily rotated between settings through a range of 0° to 360°.

In addition to the practical advantages which I herein ascribe to my novel indexing fixture, it will be observable that another chief feature of the invention resides in the fact that I provide novel and easily manipulatable locking means for locking the work holding chuck in any one of a variety of desired rotative positions and which may be adjusted in a vertical or horizontal plane or both, and that still another feature lies in an indexing fixture that will allow smoothness and ease and precision in handling and operation with a minimum need for adjustment and that permits of long continued use with a minimum of need for repair or maintenance on the part of the user, all resulting in important distinct advantages in economy of manufacture, ease of operation, reliability of performance and capability of ready assembly to provide positiveness and ease of manual control and action under varying conditions of practical use.

These and other objects of the invention will be more fully understood from a consideration of the following detailed disclosure when read in connection with the annexed drawings, in which.

It is to be first explained that the apparatus herein disclosed is intended to be adjustably mounted as a whole on a support, which may be the bed plate of a grinding or milling machine, which machine includes a cooperant grinding tool suitably driven from a power source. Same, not forming a part of the invention, is not shown herein.

The apparatus of the invention includes a base plate 10 which may be of substantially rectangular configuration which preferentially, but not obligatorily, will be adapted for affixing the assembled apparatus to the grinding machine table by magnetic attraction in accordance with well known practice, wherefore magnetizable material, such as steel, is used in its construction. To strengthen such magnetic attachment, said base plate will be as massive as is consistent with compactness.

Alternative means for clamping base plate 10 of the fixture may be substituted for the magnetic attraction means, as for example, lug means or equivalent (not shown).

Figure 1:
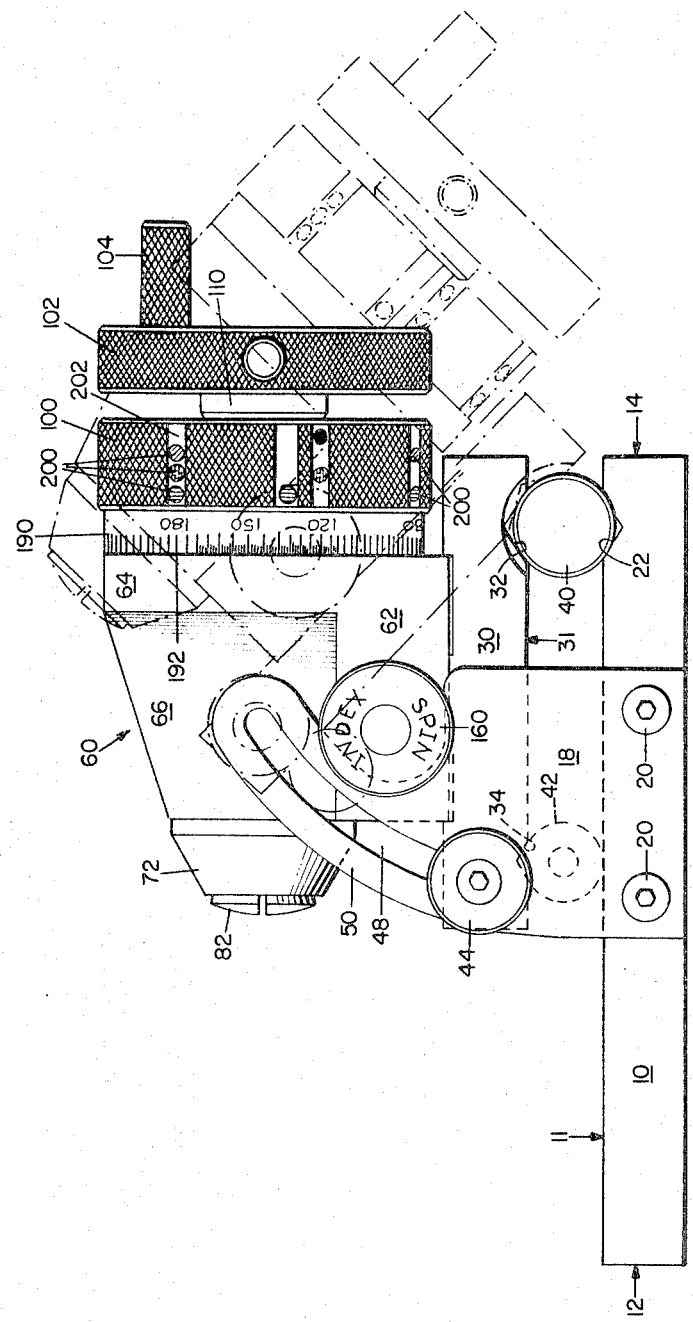
FIG. 1 is a view in side elevation of a preferred embodiment of the fixture of the invention adapted for mounting on a grinding machine table or equivalent with the rotational axis of its chuck in horizontal position being shown in solid lines, and in a tilted position being shown in phantom.

For convenience of orientational reference to components and their interrelationship, it will be considered that the vertical exterior surface 12 of base plate 10, which faces the grinding tool and is viewed at the left in FIG. 1, is its front or forward face or end, and the opposite surface 14 viewed at the right is its rear or rearward face or end.

Figure 4:
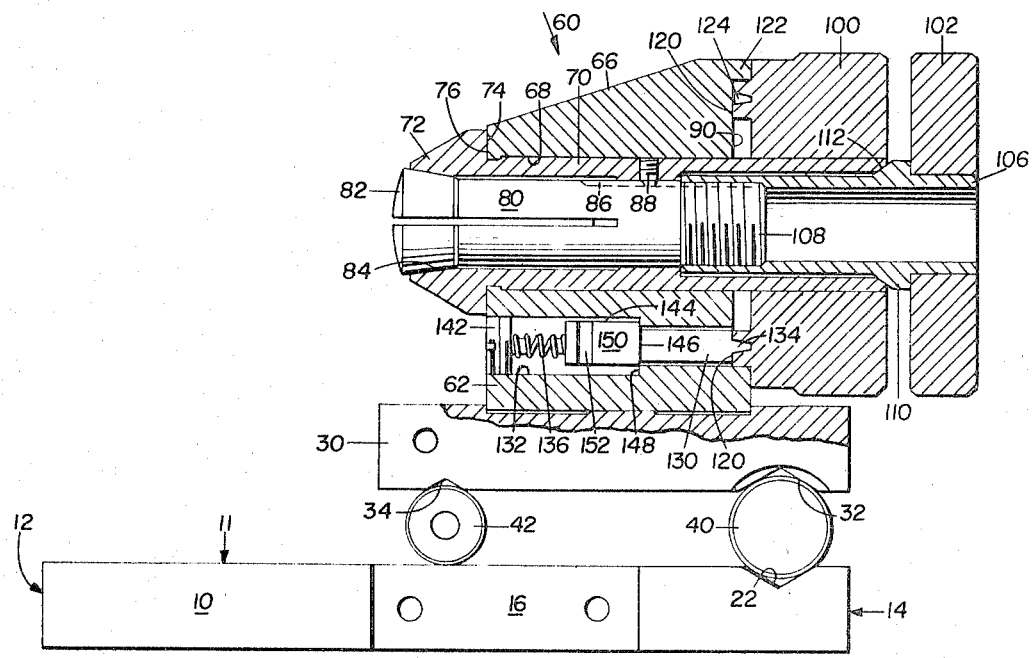
FIG. 4 is a view in side elevation, partly in section, of the fixture shown in FIG. 1, with certain components being omitted to show mechanism normally concealed thereby.

At opposite sides of base plate 10 and substantially centrally of the length thereof, aligned inwardly-extending, vertically-extending recesses 16 (see FIGS. 4 and 5) are provided for nestably receiving in each thereof a mated upstanding guide plate 18 which may be detachably secured to said base plate in any suitable manner, as by bolts 20. If desired, and within the scope of the invention, both base plate 10 and the pair of guide plates 18 may be fabricated unitarily as one piece.

Base plate 10 is provided with a transversely-disposed V-shaped notch or V-cut 22 extending between the opposite sides thereof and inwardly from the upper planar face 11 thereof.

Spaced upwardly of base plate 10 and in normal co-planar relationship therewith is a sine subbase 30, same comprising a substantially rectangular component and of dimensions so as to overlie approximately the rearward half portion of base plate 10 between guide plates 18, in manner wherefor the center of gravity of the fixture is stabilized. That is, with the fixture in rest position, it is desired that it be in a state of balance regardless of the angular positioning of the said sine subbase.

Sine subbase 30 is provided with a pair of spaced, parallel transversely-disposed V-shaped notches or V cuts 32 and 34 extending between the opposite sides thereof and inwardly from the lower planar face 31 thereof, with notch 32 being vertically alignable with relation to base plate notch 22 wherefore a pivot roll 40 may be disposed therebetween and with notch 34 being spaced from and forwardly of notch 32.

As shown, a support roll 42 is shown as being nestably received within notch 34 and as being supported upwardly of and by upper face 11 of base plate 10.

Thus functioning conjointly, pivot roll 40 and support roll 42 will be observed to hold base plate 10 and sine subbase 30 in spaced coplanar relationship as to each other when the rotational axis of the apparatus is disposed horizontally.

Alternatively, upper planar face 11 of base plate 10 may be so ground as to provide a surface upon which blocks may be placed.

Pivot roll 40 serves as the pivotal axis for swinging movement of sine subbase 30 relative to base plate 10 and between guide plates 18.

A pair of suitably knurled tightening knobs 44 each located at one of the opposite sides of sine subbase 30, and at the outside of its respective guide plate 18, and each configured to allow of a threaded stem 46, is provided. Each stem 46 is extendable through an arcuate slot 48 provided in the upstanding portion 50 of the respective guide plate 18 with the respective knob being brought to bear against the outer surface of the respective guide plate and with the outer free end of the stem being threadedly engaged in a suitably-located inwardly-extending opening in one of the sides of said sine subbase wherewith the sine subbase may be clamped, in any desired angular position, relative to the guide plates and, in turn, relative to the base plate by the tightening of knobs 44, the arcuate slots 48 in guide plates 18 being strategically-positioned to accommodate the pivoting movement of the sine subbase upon its pivotal means, pivot roll 40.

A housing or bearing pedestal, generally indicated by 60, is fixedly mounted upon sine subbase 30 and presents a lower forwardly-facing horizontally-extending base portion 62 and a rearwardly-positioned vertically-extending portion 64 projecting upwardly from and preferably integral with said base portion to allow a generally L-shaped configuration, with a gusset-like body portion 66 interconnecting therebetween and preferably integral therewith.

Housing 60 is provided with a through bearing opening 68 (see FIG. 4) which extends from front to rear along an axis which is horizontally disposed when the housing is in the position shown in solid lines in FIG. 1.

The housing is of such design as to allow complete rotary movement, that is for 360° or more of rotative adjustment, of the associated components receivable therewithin and presently to be described.

A chuck means for grippingly engaging and rotating a workpiece or tool (not shown) includes a chuck sleeve or quill 70, suitably journalled in bearing opening 68 and of such a length that its forwardly-facing extremity extends outwardly beyond the bearing opening, said extremity being enlarged to provide an annular flanged head 72 having an annular, rearward-facing, flat face 74 in parallel proximity to an annular, vertically-extending, forwardly-facing flat face 76 circumadjacent the bearing opening of body portion 66 of housing 60. A chuck collet 80 for engaging the work or tool is slideably receivable within the forwardly-facing end portion of chuck sleeve 70, with the front end of the chuck collet having the conventional slotted and tapered head 82 cooperant with a flaring mouth 84 of head 72 of chuck sleeve 70, the flaring mouth corresponding in configuration to the tapered collet head and adapted to complement same in known manner.

Chuck collet 80 is keyed by an exterior, longitudinally extending groove 86 to receive the inner extremity of a set screw 88 threadedly receivable in a suitable opening in chuck sleeve 70, thereby to preclude chuck collet rotation relative to the chuck sleeve.

To permit selective indexing of the chuck means which is constituted by chuck sleeve 70 and chuck collet 80 for the purpose of grinding various circular or polygonal faces upon the workpiece or tool, a manipulatable annular dividing head 100 and a manipulatable annular draw bar 102, the latter having a cooperant operating knob 104 fixedly secured to its rearwardly-facing face, are provided, all being peripherally-knurled to allow firm manual grasping thereof.

The rearwardly-facing end of chuck collet 80 projects to a considerable extent outwardly beyond the plane of the vertically-disposed rear face 90 of rearwardly-positioned portion 62 of housing 60 to accommodate dividing head 100 and draw bar 102 in manner to appear.

Draw bar 102 is fixed to the rearward extremity of an annular bearing sleeve 106 having a forward extremity slideably receivable within the rearwardly-facing end of chuck sleeve 70 and interiorly threaded to accommodate a threaded portion 108 of the rearwardly-facing end of chuck collet 80.

Bearing sleeve 106 is additionally provided with an external peripherally-arranged flange 110 having an inclined annular forwardly-facing face 112 mating with a complementally-inclined rearwardly-facing wall at the rearmost extremity of chuck sleeve 70.

Draw bar 102 functions to draw chuck collet 80 rearwardly when rotated in the proper direction, wherewith rotative adjustments of the chuck collet about its axis may be definitely set and quickly reset, as desired.

As draw bar 102 draws chuck collet 80 rearwardly, tapered head 82 of chuck collet 80 is compressed by flaring mouth 84 of head 72 of chuck sleeve 70 into gripping engagement with the workpiece or tool shank in known collet-closing manner.

Simultaneously therewith, inclined face 112 of flange 110 is frictionally engaged with the complemental rearwardly-facing wall of chuck sleeve 70 in manner such that draw bar 102 may be used effectively, under certain conditions of operation, in addition to, or insubstitution for, dividing head 100 as a means for workpiece or tool rotating and/or indexing.

Dividing head 100, circumscribing chuck sleeve 70 forwardly of draw bar 102, is provided on its forwardly-facing face with an outwardly-extending annular rib or rim or flange 120, concentrically related to said face and spaced radially inwardly of the dividing head peripheral surface, which annular rib 120 is rotatably receivable in and sleeved within an outwardly-extending rearwardly-facing annular peripheral rim or flange 122 on the rearwardly-facing face 90 of the rearwardly-positioned portion 64 of housing 60.

Said annular dividing head rib 120 is provided with a circular row of uniformly-angularly-spaced axial notches or slots 124.

Figures 5, 6:
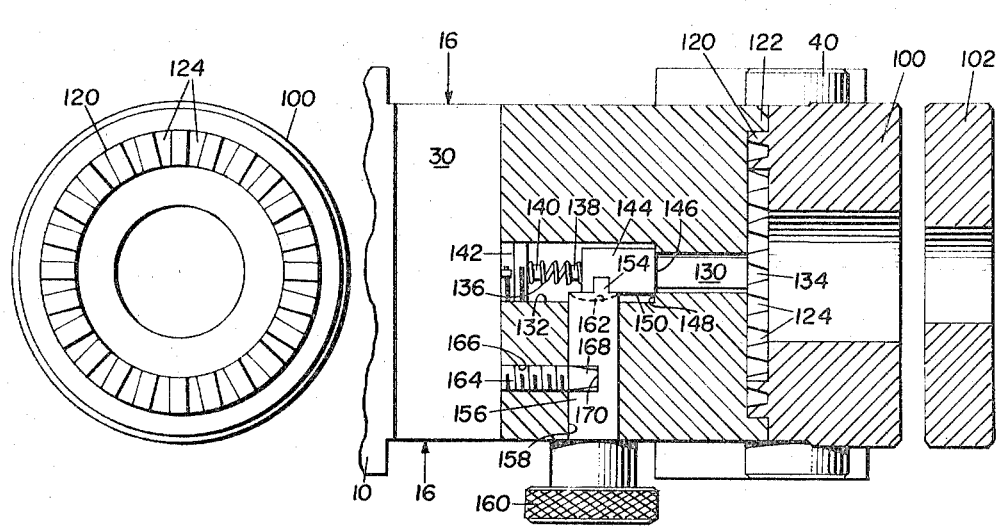
FIG. 5 is a fragmentary view in top plan, partly in section, of the fixture shown in FIG. 1, again with certain components being omitted for purposes of clarity.
FIG. 6 is a view in front elevation showing details of the dividing head of the fixture shown in FIG. 1.

While a total of twenty-four such notches or slots 124 are represented in FIG. 6 as being provided, thus to divide a circle into angular segments of 15° each, whereby indexing in 15° increments is permitted, it will be understood that a greater or lesser number of such notches may be provided, without departing from the spirit and scope of the invention.

To permit the registering of dividing head 100 in each of the 24 angularly adjusted positions, a detent means is provided to include a detent or index pin 130 of generally cylindrical form which is enclosed and guided for free sliding axial movement in a horizontally-extending bore 132 provided in housing 60, preferentially in the base portion 62 thereof.

The rearwardly-facing end of detent 130 is provided with a nose 134, said nose being of reduced diameter suitable for snugly fitting within one of the notches or slots 124 when said detent is urged rearwardly by means of a compression spring 136 which is sleeved at its rearward end upon a coaxial pin head 138 unitary with and extending outwardly and forwardly from the forwardly-facing end of the detent and sleeved at its forward end upon a pin head 140 extending rearwardly from the rearwardly-facing face of an adjustment screw or tensioning member 142 which has screw threaded engagement within the forwardmost portion of bore 132.

Compression spring 136 may be compressed by the rotative movement of adjustment screw or tensioning member 142 so as to force detent 130 rearwardly whereby nose 134 may be projected into checking, or locking, engagement with any selected notch 124 of dividing head 100 when same is in registry with bore 132.

Additionally, detent 130 is provided with a body portion 144 of enlarged diameter at its rearmost portion to define a rearwardly-facing annular shoulder 146 adapted to abut a forwardly-facing annular shoulder 148 provided in bore 132, such arrangement acting to provide a limit stop for limiting the range of rearward movement of detent 130 toward dividing head 100.

Whether dividing head 100 is lightly checked in motion, wherewith to effect a clicking count-aiding sound, or is positively locked against any motion in any selected indexed position, or is free for noiseless rotation, depends upon the tension intentionally applied to spring 136 by adjustment screw 142.

Further additionally, body portion 144 of detent 130 is provided with a flat 150 at one side of its peripheral surface, said flat 150 having a vertically-extending notch 152 therein, which notch is adapted to receive an inwardly-extending pin 154 projecting outwardly from and unitary with the inner free extremity of a cam shaft 156 rotatably-disposed in a transversely-extending bore 158 extending inwardly from one side of housing 60 and intersecting bore 132.

Rotation of cam shaft 156 may be effectuated by appropriate manipulation of a knurled knob 160 fixedly secured to the outer extremity of the cam shaft by any suitable means.

The inner end of cam shaft 156 is provided with a cam surface 162 adapted to bear against the flat 150 of body portion 144 of detent 130 to the end that rotation of knob 160 in one direction effectuates the withdrawal of nose 134 from its engagement in one of the notches 124 of dividing head 100, thereby permitting free rotation of the dividing head, and further to the end that rotation of knob 160 in the opposite direction effectuates the return of nose 134 into seating engagement into the aligned notches of the dividing head.

A set screw 164, threaded in a suitably-located, horizontally-extending opening 166 in base portion 62 of housing 60 and intersecting cam shaft bore 158, has an inner end 168 receivable in a strategically-located notch 170 provided in one side of cam shaft 156 and serves to limit the range of rotative movement of cam shaft 156, and also to insure the proper positioning of pin 154 of the cam shaft in notch 152 of the detent.

Figure 2:
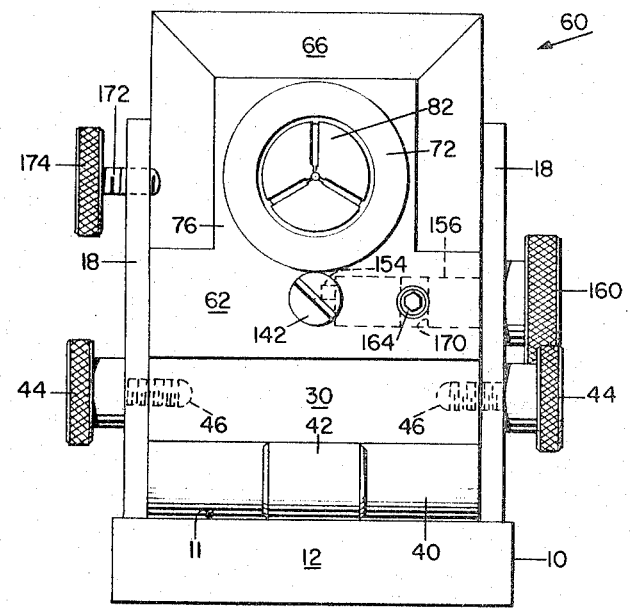
FIG. 2 is a view in front elevation looking at the fixture shown in FIG. 1 from the left hand end thereof.

A transversely-extending locking screw 172 (see FIGS. 2 and 3), having a knurled operating knob 174 fixedly secured to its outer end, is threaded in body portion 66 of housing 60, with its inner end adapted to bear against the outer periphery of rim 120 of dividing head 100, thus locking said dividing head in any rotative position to which it may be adjusted during operational use.

Figure 3:
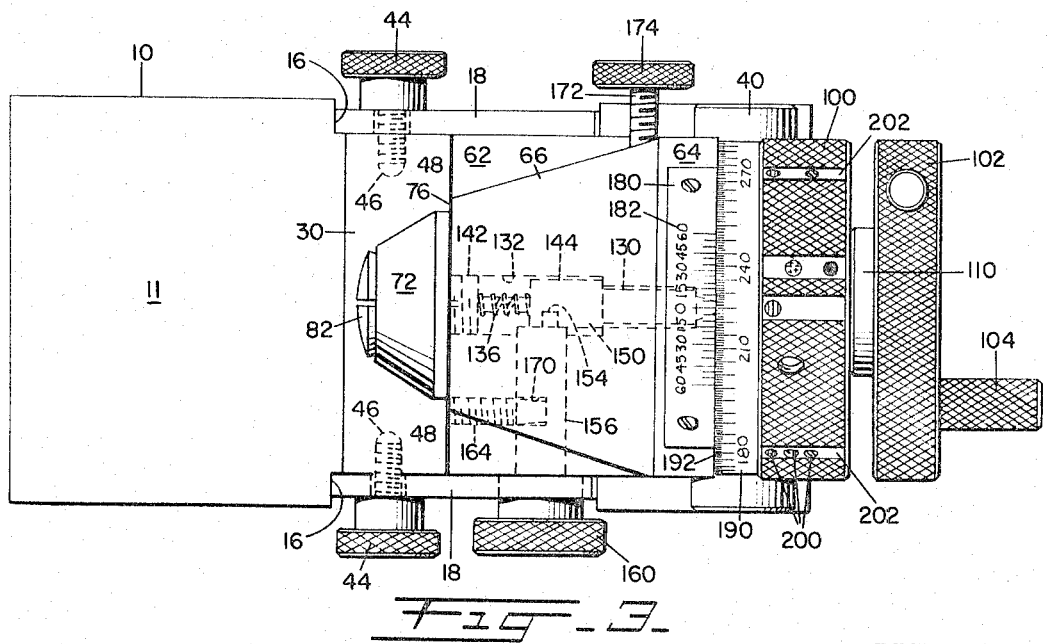
FIG. 3 is a view in top plan of the fixture shown in FIG. 1.

As best seen in FIG. 3, a scale 180 is provided on the upper planar surface of rearwardly-positioned portion 64 of housing 60, adjacent dividing head 100, said scale bearing graduations of indicia 182 within the range from 0° to 60°.

Dividing head 100 carries a scale 190 on its periphery at its forwardly-facing side edge bearing graduations of indicia 192 within the range from 0° to 360°, and being alignable with indicia 182 of scale 180 by rotation of the dividing head.

Dividing head 100 additionally carries a plurality of brightly colored dots 200 about its outer periphery, said dots being arranged in spaced rows 202, each row of dots extending in a front-to-rear direction and being spaced each from the other so as readily to indicate a predetermined number of degrees on scale 190.

Figure 7:
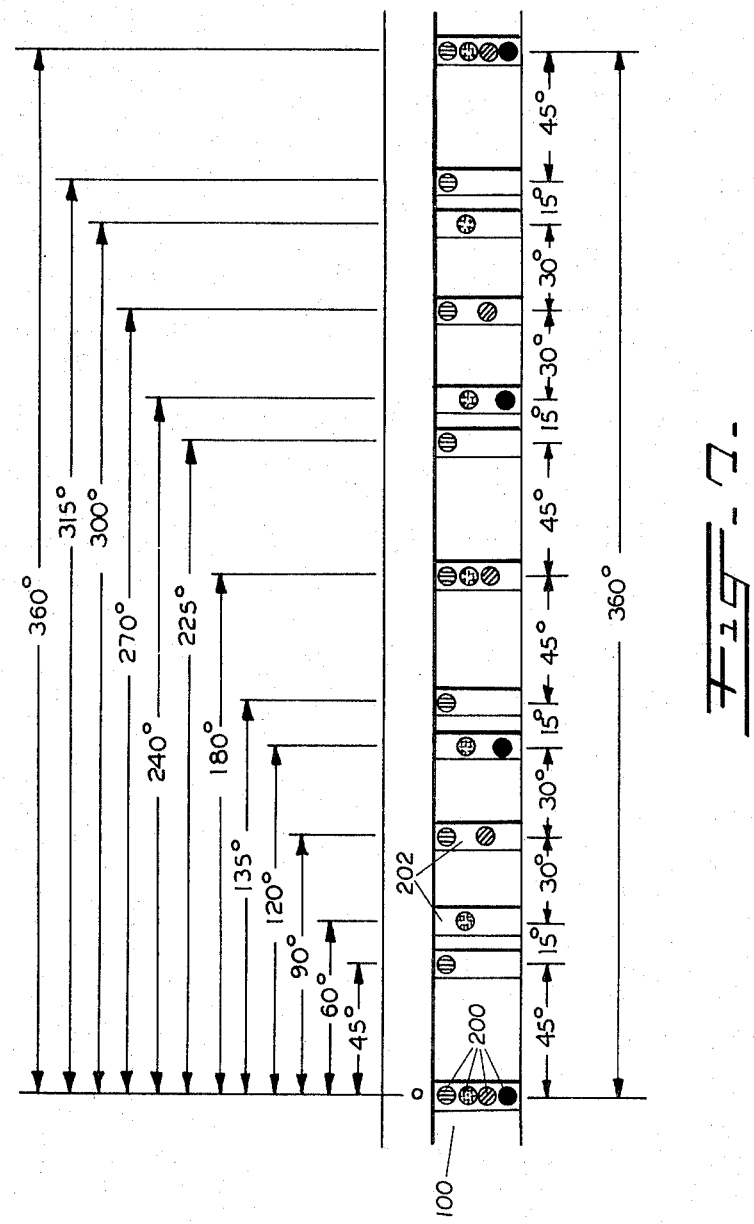
FIG. 7 is a diagrammatic representation of the color coding delineated upon the dividing head of the fixture.

Referring to FIG. 7, it will be seen that the rows of dots 202 are arranged in 15°, 30° and 45° increments of spaced relationship about the periphery of dividing head 100, wherefore an operator may quickly and easily obtain a desired setting of a workpiece by reference to the position of a row of dots relative to scale 180 and may easily change this position, having the intelligence that the rows of dots are spaced 15°, 30° and 45° apart.

The construction of my novel indexing device, having been described, its manner of use will now be explained.

With a workpiece firmly secured in chuck collet 80, in known collet closing manner, sine subbase 30 and housing 60 may be angularized relative to base plate 10 by loosening knobs 44 whereupon their stems 46 may be caused to ride upwardly or downwardly, as the case may be, within the respective guide plate slots 48 wherewith sine subbase may be located in any desired angular position, whereupon knobs 44 are retightened to lock sine subbase 30 and housing 60 relative to guide plates 18.

If desired, sine blocks, not shown, may be placed under support roll 42 to support sine subbase 30 in this angular position.

By such tilting of the fixture to a position, such as that shown in broken lines of FIG. 1, the grinding of tapered surfaces on a workpiece may be facilitated.

The workpiece having been properly angularly-orientated, it may now be rotated by loosening locking knob 174, and rotating cam shaft knob 160 to effect the withdrawal of nose 134 of detent 130 from its position in one of the notches 124 of dividing head 100, whereupon the dividing head may be rotated by manipulation of operating knob 104 or draw bar 102 or the dividing head 100 per se to the desired setting, whereupon cam shaft knob 160 is rotated in the opposite direction to cause nose 134 of detent 130 to reenter one of the notches 124 and locking knob 174 is rotated to lock dividing head 100 in position.

The same procedure will be followed in any subsequent resetting of dividing head 100, with reference being had to the rows 202 of colored dots for quick and easy setting.

It will be understood that it is intended to cover all changes and modifications of the example of the invention herein chosen for the purpose of illustration which do not constitute departures from the spirit and scope of the invention.

Having thus described the invention, I claim:

1. In an indexing fixture for a grinding machine, a base plate for mounting the fixture relative to the bed of the grinding machine, a sine subbase pivoted to said base plate, means for releasably locking said sine subbase in any one of a plurality of angular positions relative to said base plate, a housing fixed to said sine subbase and having a chuck collet extending longitudinally therethrough, a manipulatable annular dividing head sleeving said chuck collet and being rotatable relative to said housing, said dividing head carrying an annular rib on one face thereof, said rib being provided with a circular row of uniformly angularly spaced axial notches, a manipulation annular draw bar in threaded engagement with said chuck collet for clamping said chuck collet relative to a workpiece, a spring-loaded detent member slideably disposed in said housing, said detent member having a coaxial nose adapted for seating engagement within one of the notches of said dividing head under spring force, primary locking means in said housing for releasably locking the nose of said detent member in one of the notches of said dividing head, secondary locking means in said housing for releasably locking said dividing head against rotation relative to said housing, registering scales on said housing and said dividing head bearing graduations of indicia within the range from 0° to 360°, and a plurality of colored dots arranged on the outer peripheral surface of said dividing head in predetermined increments of spaced relationship to indicate a predetermined number of degrees on the scale on said dividing head.

2. In an indexing fixture as set forth in claim 1 wherein said primary locking means comprises a cam shaft rotatably mounted in said housing and having an inwardly-extending pin projecting outwardly therefrom and receivable in said detent member, said cam shaft additionally being provided with a cam surface adapted to bear against said detent member wherefore rotation of said cam shaft in one direction effectuates the withdrawal of the nose of said detent member from its engagement in one of the notches of said dividing head to permit free rotation of said dividing head, and wherefore rotation of said cam shaft in the opposite direction effectuates the return of the nose of said detent member into seating engagement into one of the notches of said dividing head locking said dividing head against rotation.

3. In an indexing workpiece or tool holding fixture for a work-performing machine, the combination of, a base plate for mounting the fixture relative to the machine, a sine subbase spaced upwardly of said base plate and adapted for swinging movement relative to said base plate, means for releasably securing said sine subbase in a selected angularly oriented position relative to the main axis of said base plate, an apertured bearing pedestal fixed to said sine subbase, a quill and collet extendable through the aperture of said bearing pedestal, said collet being sleeved within and secured relative to said quill, a manipulatable dividing head concentrically mounted on said quill in confronting relation with said bearing pedestal, said dividing head being provided on its bearing pedestal-confronting surface with an annular rib provided with a plurality of angular position indexing notches arranged at equal angular divisions of a circle, a rotatable draw bar threadedly connected to said collet for drawing said collet into and out of work-clamping position relative to said quill, a spring loaded indexing detent mounted in said bearing pedestal for selective registry with and seating engagement in a selected one of the angular position indexing notches of said dividing head under spring pressure according to the rotary adjustment of said dividing head and quill to a preselected indexed position, retracting means for retracting said indexing detent from said dividing head for the free turning thereof, primary locking means for releasably locking said detent in one of the indexing notches of said dividing head, secondary locking means for releasably locking said dividing head against rotation relative to said bearing pedestal, an indicator scale on the outer periphery of said bearing pedestal and a graduated scale on the outer periphery of said dividing head, the indicia of said dividing head scale being registrable with the indicia of said bearing pedestal scale for indicating the desired rotational positioning of said dividing head and quill and collet between positions within a 360° range, and a plurality of colored dots on the outer periphery of said dividing head arranged in increments of spaced relationship for indicating a predetermined number of degrees on said graduated scale.

References Cited by the Examiner

UNITED STATES PATENTS

| | | | |
|---|---|---|---|
| 1,788,163 | 1/1931 | Klausmeyer | 116—115.5 |
| 2,278,263 | 3/1942 | Hoelscher | 116—115.5 |
| 2,366,512 | 1/1945 | Gardner | 116—115.5 |
| 2,564,566 | 8/1951 | Duffy | 33—174 |
| 2,672,714 | 3/1954 | Wilson | 51—216.6 |
| 2,701,432 | 2/1955 | Kent | 51—216.6 |
| 2,704,671 | 3/1955 | Abramoska et al. | 51—216.6 |
| 2,803,064 | 8/1957 | Eisele | 33—174 |
| 2,958,988 | 11/1960 | Crosby | 51—216.6 |

HAROLD D. WHITEHEAD, *Primary Examiner.*